April 14, 1953 G. F. MOYER ET AL 2,634,457
MACHINE FOR SPLITTING HOGS, BEEF AND THE LIKE
Filed Nov. 4, 1949 3 Sheets-Sheet 1

Inventors
Gerald F. Moyer
William H. Mitchell

By Clarence A. O'Brien
and Harvey B. Jacobson
Attorneys

April 14, 1953 G. F. MOYER ET AL 2,634,457
MACHINE FOR SPLITTING HOGS, BEEF, AND THE LIKE
Filed Nov. 4, 1949 3 Sheets-Sheet 3
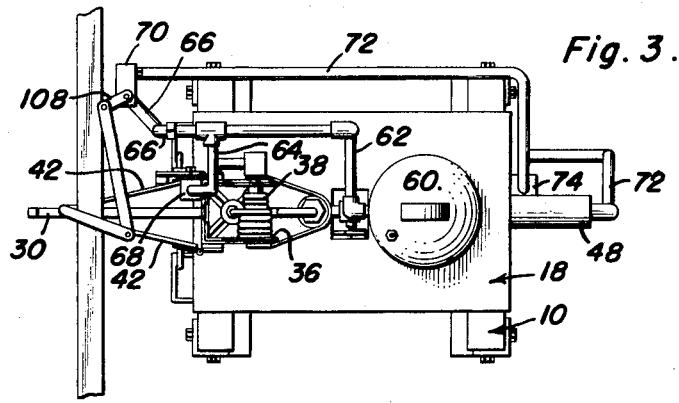
Fig. 3.
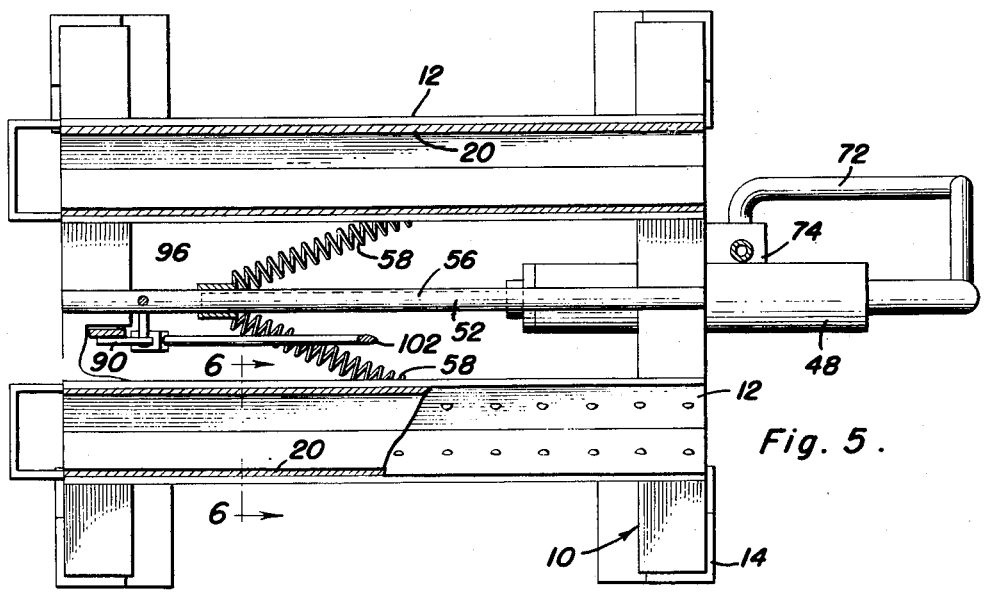
Fig. 5.
Fig. 6.
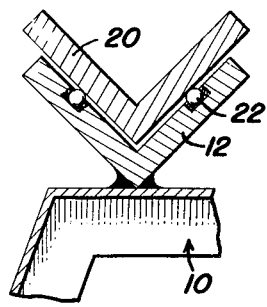
Inventors
Gerald F. Moyer
William H. Mitchell
By *Clarence A. O'Brien
and Harvey B. Jacobson*
Attorneys Patented Apr. 14, 1953

2,634,457

UNITED STATES PATENT OFFICE 2,634,457

MACHINE FOR SPLITTING HOGS, BEEF, AND THE LIKE

Gerald F. Moyer and William H. Mitchell, Marshalltown, Iowa

Application November 4, 1949, Serial No. 125,508

8 Claims. (Cl. 17—23)

This invention relates to new and useful improvements in machines for splitting meat, such as hogs, beef and the like, and the primary object of the present invention is to provide a machine for splitting the backbones of hogs, beef and the like after the said animals have been initially split.

Another important object of the present invention is to provide a machine for splitting hogs, beef and the like including a spreading mechanism that will effectively spread a split animal and a cutting member that is synchronized with the spreading mechanism whereby the cutting member will move to split the backbone of an animal as the animal is spread by the spreading mechanism.

A further object of the present invention is to provide a machine that will spread a split animal, and split the backbone of an animal while the animal is held spread.

A still further aim of the present invention is to provide a machine of the aforementioned character that is simple and practical in construction, strong and reliable in use, efficient and durable in operation, small and compact in structure, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plan view of Figure 1;

Figure 4 is a view similar to Figure 1 and with parts broken away to show details and with dotted lines showing the cutter and the lift means for the cutter in their lowered position;

Figure 5 is an enlarged transverse horizontal sectional view taken substantially on the plan of section line 5—5 Figure 4; and, Figure 6 is an enlarged detail sectional view taken substantially on the plane of section line 6—6 Figure 5.

Figure 1:
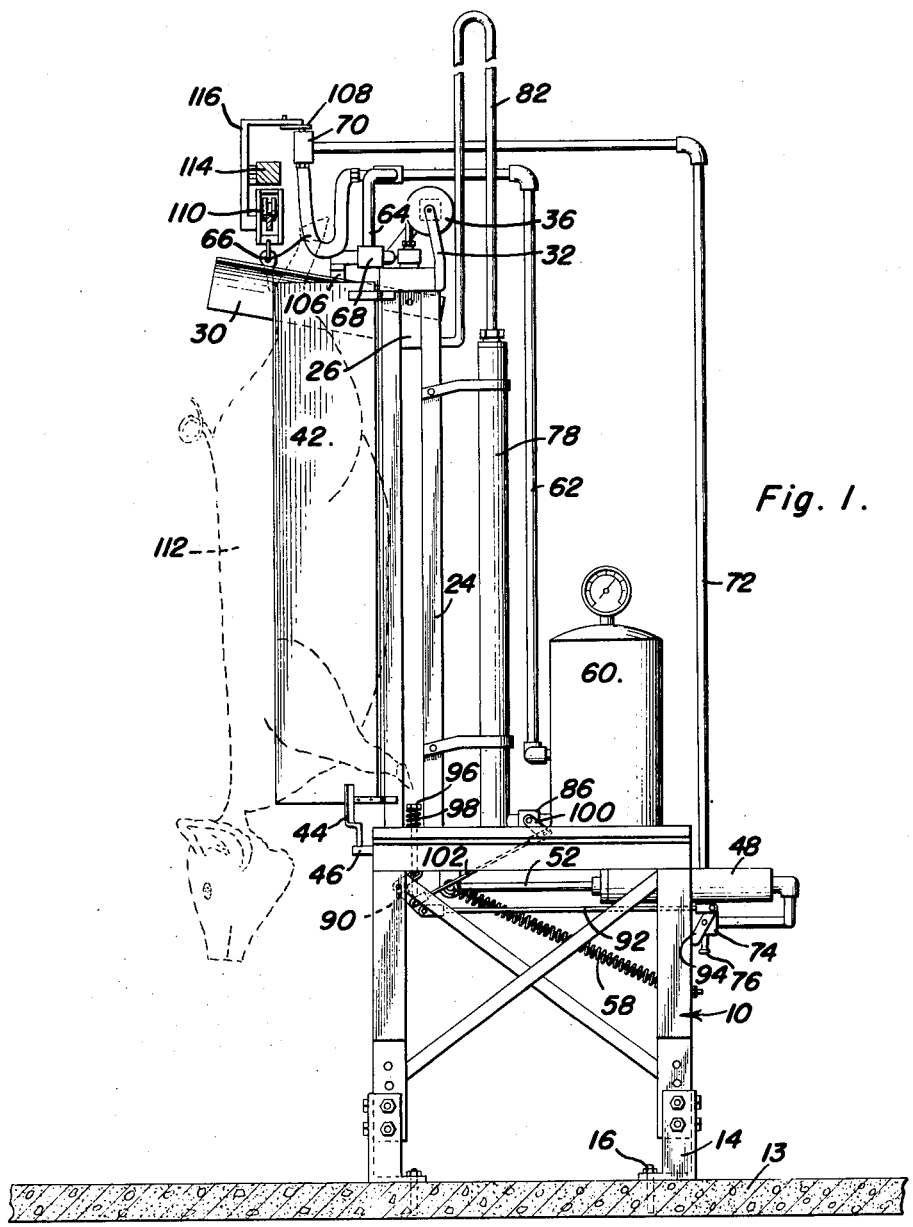
Figure 1 is a side elevational view of the present invention and showing in dotted lines a hog in position to have its backbone split by the machine.
Figure 2:
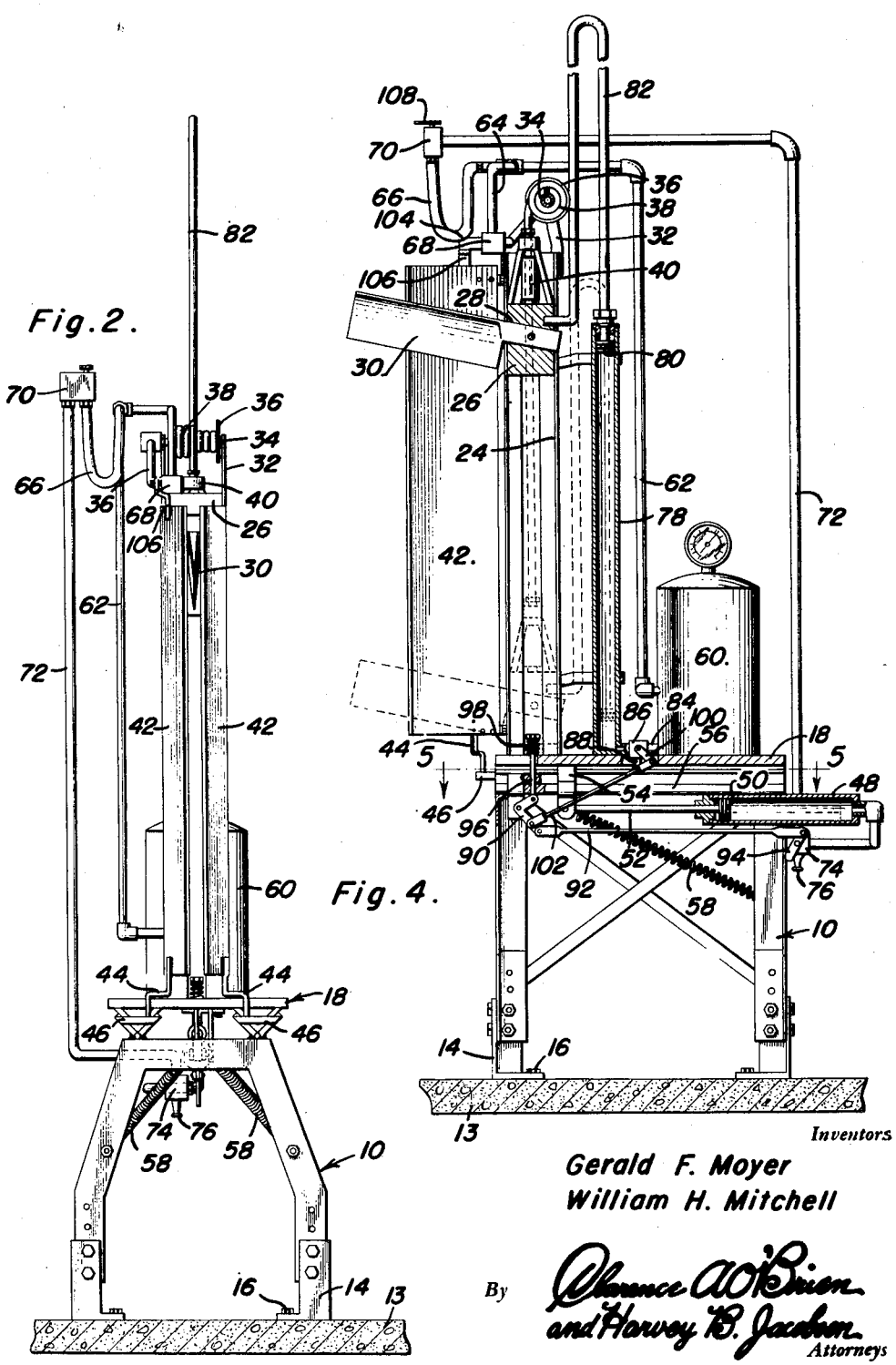
Figure 2 is a front elevational view of Figure 1.

Referring now to the drawing in detail, wherein for the purpose of illustration, there is disclosed a preferred embodiment of the present invention, the numeral 10 represents a support or table structure having a pair of spaced parallel, horizontally disposed, substantially V-shaped guide troughs 12 secured to the upper portion thereof. The table structure is of any suitable type and it is preferred that the legs of the table structure be anchored to a floor 13 through the medium of uprights 14 and anchor bolts 16 in order to prevent accidental movement or overtipping of the table structure.

A carriage 18 is mounted for horizontal sliding movement on the table structure and includes a pair of substantially V-shaped rails 20 that are received within the guide troughs 12. A plurality of anti-friction members or ballbearings 22 mounted on the inner surface of each guide trough 12 bear against the outer surface of each rail 20 to permit, free, unrestricted sliding movement of the rails and consequently the carriage relative to the table structure.

Pairs of spaced parallel angle iron guide members 24 rise from the carriage 18 and slidably receive a block 26 having a vertically inclined opening 28 in which there is suitably fixed the shank portion of a cutter or cleaver 30. Bearings 32 mounted on the upper ends of the guide channels 24 rotatably support a tubular shaft 34 on which there is secured a drum 36. A flexible conduit or hose 38 is wound about the drum 36 and one end of the hose is coupled by any suitable means to a suitable air hammer 40 supported on the block 26.

Mounted on the guide members 24 for horizontal swinging movement is a pair of complementary spreading members or plates 42 the lower ends of which support depending cam members 44 that will engage stops or abutments 46 mounted on the table structure to effect a spreading of the members 42 as the carriage is moved from a position directly above the table structure to a position forwardly of the table structure.

Means is provided for moving the carriage forwardly of the table structure, and this means includes a pump cylinder 48 that is mounted on the table structure. The pump cylinder 48 slidably receives a piston 50 and a piston rod 52, the latter being secured to a bracket or guide 54 that depends from the carriage. The guide 54, in addition to its function as a connector between the piston rod 52 and the carriage 18, is also slidably received on a guide bar 56 fixed to the table structure to guide the sliding movement of the carriage relative to the table structure.

Elongated spring members or coil springs 58 are terminally secured to the bracket 54 and the rear portion of the table structure 10 to yieldingly urge the carriage to a position directly above the table structure and therefore counteract the movement of the carriage by the piston rod 52, but not sufficiently to restrict the carriage from being moved by the piston rod forwardly of the table structure.

A supply tank 60, filled with fluid under pressure by any suitable means, is mounted on the carriage for movement therewith and includes an outlet line or conduit 62 from which there branches supply lines or conduits 64 and 66. The line 64 extends to a valve housing 68 mounted on one pair of the guide members 24 and the housing 68 is also connected to one end of the hose 38 so that when the valve (not shown) in the housing 68 is moved to its open position, fluid, under pressure in the tank 60, will pass through the line 62, enter the housing 68 and then pass through the hose 38 to actuate the air hammer 40 thereby forcing the block 26 and the cutter 30 downwardly in the guide members 24.

The branch conduit 66 is connected to a further valve housing 70 which in turn is connected to a supply conduit or line 72 that extends to the rear end of the pump cylinder 48. A still further valve housing 74 is interposed in the supply conduit 72 and includes a drain nipple 76. The branch conduit 66 is necessarily flexible since the conduit 62 and 64 will move relative to the conduit 72, however, the remaining conduits may be of relatively rigid material, such as copper.

Means is provided for lifting or raising the block 26 and the cutter 30 after the same have been lowered. This means consists of an upstanding pump cylinder 78 in which there is slidably mounted a piston 80 and one leg portion of a substantially U-shaped piston rod 82. The remaining leg portion of the piston rod 82 is provided with a lateral projection that is detachably secured to the block 26.

The lower end of the pump cylinder 78 is connected to an outlet 84 extending from the tank 60. Yet another valve housing 86 having a drain nipple 88 is provided in the outlet 84 whereby a fluid, under pressure in the tank 60, may be admitted into the pump cylinder 78 to raise the piston 80, the piston rod 82 and consequently the block 26 and the cutter 30.

A bell crank lever 90 is pivoted on the carriage 18 and includes upper and lower leg portions. The lower leg portion of the lever 90 is pivoted to the forward end of an actuator link or pitman 92 and the rear end of the link 92 is pivoted to an operating arm 94 for the valve (not shown) in the valve housing 74 so that as the link 92 is moved forwardly the valve (not shown) in the housing 74 will be moved to a position to permit fluid in the pump cylinder 48 to exit by-way-of the drain nipple 76 and the springs 58 can return the carriage 18 to its normal position directly over the table structure 10.

A vertically movable rod 96 is carried by the carriage 18 and its lower end is pivoted to the upper leg portion of the lever 90. A spring 98 urges the rod 96 upwardly until the block 26, sliding downwardly on the channels 24, contacts the rod 96 at which time the lever 90 will be rocked to move the link 92 forwardly to permit fluid in the cylinder 48 to exit through the drain nipple 76.

The lower leg portion of the lever 90 is connected to the valve operating arm 100 for the valve in the housing 86 by a further link or pitman 102 so that as the link 92 moves forwardly the valve in the housing 86 will be moved to block the drain nipple 88 and permit fluid, under pressure in the tank 60, to pass into the cylinder 78 to effect a lifting of the block 26 and the cutter 30. However, when the link 102 is moved rearwardly, as a result of the spring 98, the valve in the housing 86 will be moved to permit fluid in the cylinder 78 to drain therefrom by way of the nipple 88 to thereby permit the air hammer 40 to force the block 26 and the cutter 30 downwardly without restriction from fluid in the cylinder 78.

The valve mounted in the housing 68 is also provided with an operating arm 104, so placed that it will be engaged by a lug 106 on one of the members 42 as the members 42 are spread, in order to open the valve in the housing 68 and permit fluid, under pressure in the tank 60, to enter the hose 38 for actuating the hammer 40.

There is also provided an operating arm 108 for the valve in the housing 70 so that fluid, under pressure in the tank 60, may be directed into the pump cylinder 48 to cause a forward movement of the carriage relative to the table structure 10. This latter operating arm, 108, is actuated in a manner which will be described when referring to the mode of operation of the present machine.

In practical use of the present invention, the carriage 18 is disposed directly above the table structure 10, the piston rod 52 is retracted and the block 26 and the cutter 30 are raised. As a trolley 110 supporting a hog or the like 112 is moved along a guide bar 114, a bracket 116 on the trolley 110 will actuate the valve in the valve housing 70 to permit a fluid in the tank 60 to pass into the cylinder 48 to cause the carriage 18 to move forwardly of the table structure 10.

The hog 112 is split prior to its placement on the trolley 110 and as the carriage 18 moves forwardly the cam members 44 will engage the abutments 46 to open the members 42, which enter the split in the hog 112, thereby effecting a spreading of the hog.

As the members 42 open, a predetermined amount, the lug 106 will engage the operating arm 104, opening the valve in housing 68, to actuate the hammer 40 and cause the block 26 to be forced downwardly whereupon the cutter 30 will split the backbone of the hog.

When the block 26 contacts and urges the rod 96 downwardly, the valve in housing 74 will be moved to release fluid from the cylinder 48 and the valve in housing 86 will be moved to permit the entrance of fluid into the cylinder 78 whereby the carriage 18 will be moved rearwardly, by springs 58, and the block 26 and cutter 30 will be raised, it being understood that the trolley 110 is moved to permit the next trolley to actuate the valve in housing 70 and start the operation again.

Obviously, the instant structure may be operated by air, electricity or liquid drive although the simplest and most economical prime mover is the hydraulic means illustrated.

Having described the invention, what is claimed as new is:

1. A machine for splitting hogs, beef and the like comprising a support, a carriage slidably mounted on said support, a vertically movable cutter on said carriage, means carried by said carriage for spreading a split hog, means mounted on the support and connected to the carriage for moving the carriage relative to the support, means operated by the spreading means for forcing the cutter downwardly to split the backbone of a hog, and means connecting the carriage to the support and counteracting the means for moving the carriage relative to the support.

2. A machine for splitting hogs, beef and the like comprising a support, a forwardly and rearwardly movable carriage slidably mounted on said support, a vertically movable cutter on said carriage, means connecting the carriage to the support and carried by said carriage for spreading a split hog, means mounted on the support and operatively connected to the carriage for moving the carriage relative to the support and for retaining the carriage in its forward position, means operated upon a downward movement of the cutter for arresting the operation of the means for moving the carriage relative to the support, means operated by said spreading means for forcing the cutter downwardly to split the backbone of a hog, and means resiliently restricting forward movement of the carriage.

3. The combination of claim 1 wherein said means for spreading a split hog includes a pair of swingable spreading members, said members being spread upon movement of said carriage relative to said support.

4. A machine for splitting the backbones of split animals comprising a support, a horizontally slidable, forwardly and rearwardly movable carriage on said support, a vertically movable cutter mounted on said carriage, means mounted on the support and connected to the carriage for moving the carriage forwardly to a position for splitting the backbone of an animal, means on the support activated by an animal approaching the support for operating said carriage moving means, means on said carriage and actuated by the support as the former moves forwardly for spreading a split animal, means connected to the cutter for forcing the cutter downwardly, and control means operated by the animal spreading means for activating said means for forcing the cutter downwardly.

5. The combination of claim 4 and a means connected to the cutter for raising the cutter and a means on the support controlling said cutter raising means and operated by said cutter.

6. A machine for splitting the backbones of split animals comprising a support, a horizontally slidable, forwardly and rearwardly movable carriage on said support, a vertically movable cutter mounted on said carriage, a pressure tank on said carriage, a cylinder carried by said support and connected to said tank, a piston rod received by said cylinder and connected to said carriage for moving the carriage away from the support as fluid under pressure in the tank enters the cylinder, a valve on the support and connected to the tank and cylinder actuated to an open position as a split animal approaches the support to permit fluid under pressure to enter the cylinder from the tank, a pair of spreaders on the carriage for spreading a split hog, means carried by the carriage engaging and spreading said spreaders upon forward movement of the carriage, an air hammer connected to the tank for moving the cutter downwardly, a further valve operatively connected to said air hammer and actuated to an open position during spreading of said spreaders to activate said air hammer, means connecting the carriage to the support and yieldingly urging said carriage rearwardly, and a still further valve on said carriage operatively connected to said cylinder and actuated by said cutter to release fluid in said cylinder and thereby permit said last mentioned means to retract said carriage to its rearward position.

7. The combination of claim 6 and a means connected to said tank and to said cutter for raising the cutter and a relief valve member on said carriage also operated by said cutter to its open position to permit fluid in the tank to be utilized for raising the cutter.

8. The combination of claim 6 and a further, vertically disposed, cylinder supported on said carriage, a further piston associated with said further cylinder and connected to said cutter, said further cylinder being connected to said tank to effect a movement of the further piston to lift the cutter upon entrance of fluid into the further cylinder, and a valve member operated by the cutter for permitting a fluid in the tank to enter the further cylinder.

GERALD F. MOYER.
WILLIAM H. MITCHELL.

References Cited in the file of this patent

UNITED STATES PATENTS

| Number | Name | Date |
|--------|------|------|
| 556,956 | Boyd | Mar. 24, 1896 |
| 768,236 | Pratt | Aug. 23, 1904 |
| 783,426 | Frey | Feb. 28, 1905 |
| 1,203,753 | Letin | Nov. 7, 1916 |
| 1,271,909 | Karhan | July 9, 1918 |
| 2,403,518 | Gaddini | July 9, 1946 |